United States Patent

[11] 3,611,050

| [72] | Inventor | Clement J. Weber<br>Vanderburgh County, Ind. |
|---|---|---|
| [21] | Appl. No. | 49,863 |
| [22] | Filed | June 25, 1970 |
| [45] | Patented | Oct. 5, 1971 |
| [73] | Assignee | Diversified Electronics, Inc.<br>Evansville, Ind. |

[54] PHASE SEQUENCE AND PHASE LOSS MONITOR
5 Claims, 1 Drawing Fig.

[52] U.S. Cl. ............................................. 317/148.5 B,
317/27, 317/31, 317/33 SC, 317/48
[51] Int. Cl. ............................................. H02h 3/26
[50] Field of Search ............................................. 317/148.5
B, 27, 47, 48, 31, 123 DX, 33 SC

[56] References Cited
UNITED STATES PATENTS

| 2,975,334 | 3/1961 | Callan | 317/48 |
| 3,364,363 | 1/1968 | Iordanidis | 317/47 X |
| 3,495,130 | 2/1970 | Bruner et al. | 317/48 X |

*Primary Examiner*—James D. Trammell
*Attorney*—Warren D. Flackbert

ABSTRACT: Solid-state circuitry offering protection to electrical and electronic equipment from incorrect phase sequence connection, low voltage or a phase failure on a three-phase power system. If phasing is correct and full line voltage is present on all three phases, an internal control relay is energized, where, in a contrary situation, the aforesaid control relay becomes deenergized. The monitor represents an important safety device where connection to the powerline is critical, or where loss of voltage or of one or more phases may cause damage to electrical equipment.

PATENTED OCT 5 1971 3,611,050
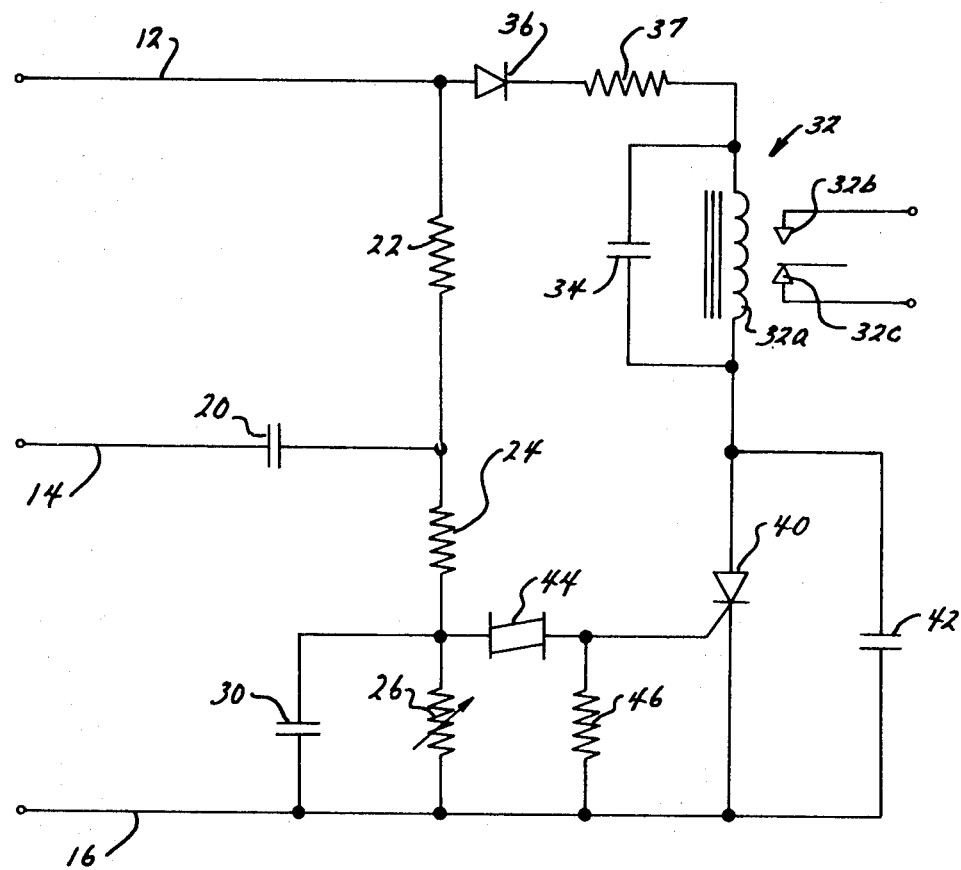
INVENTOR
CLEMENT J. WEBER
BY *Warren D. Hackbert*
ATTORNEY

PHASE SEQUENCE AND PHASE LOSS MONITOR

As is known, the protection of electrical equipment, such as large motors, compressors, pumps, machines, lamp loads, transformers and the like, is quite important, considering replacement expenditure and, as well, the loss of operating time. The invention provides such a purpose, being positive in end results and adaptable to monitor either a delta or a Y three-phase system. The monitor can serve an indicator or warning function, and also various control functions, such as, for example, the control of small loads or the control of larger relays or contactors, the latter being used in association with other type of electrical equipment.

Basically, the monitor of the invention represents a circuit arrangement including solid-state components, namely, by way of example, a diode, a bilateral switch and a silicon-controlled rectifier (SCR). The aforesaid circuitry has three input lines respectively connected to a three-phase power system. The circuitry further includes a controlled relay which is normally energized, but which, upon phase loss, phase reversal or voltage loss, becomes deenergized, causing the discontinuation of operation of any controlled equipment. The invention may assume different manufacturing forms, i.e. may be used as a plug-in unit or may be surface mounted. In any event, the circuitry defining the invention is the same irrespective of how the end product appears or is used.

A better understanding of the present invention will become more apparent from the following description, taken in conjunction with the accompanying drawing, wherein the latter illustrates the circuitry defining the invention.

For the purposes of promoting a better understanding of the principles of the invention, reference will now be made to the embodiment illustrated in the drawing and specific language will be used to describe the same. It will nevertheless be understood that no limitation of the scope of the invention is thereby intended, such alterations and further modifications of the illustrated device and such further applications of the principles of the invention as illustrated therein being contemplated as would normally occur to one skilled in the art to which the invention relates.

Referring now to the figures, lines 12, 14 and 16 re respectively connected to a three-phase electrical power system (not shown). Line 14 includes a capacitor 20 for phase-shifting purposes. A resistor 22 is disposed between lines 12 and 14, while another resistor 24 is disposed between lines 14 and 16, in series with either a fixed or variable resistor 26. Resistor 26 is bypassed by a capacitor 30.

The circuitry further includes a DC relay 32 having a coil 32a and contacts 32b and 32c, bypassed by a capacitor 34. Line 12 connects to relay 32 through a solid-state component 36, in the form of a diode, and a resistor 37.

The other side of relay 32 connects to another solid-state component 40, in this instance a commonly known SCR, the latter being bypassed by a capacitor 42. The cathode of the SCR 40 connects to line 16, and the gate connects to a further solid-state component 44, in the form of a silicon bilateral switch. The circuit is completed by a resistor 46 for bleedoff purposes with respect to the SCR 40. The other side of the switch 44 connects the line between resistor 24 and resistor 26.

Depending upon component values, the aforedescribed circuitry can be used on any three-phase voltage supply, such as 120 volts AC, 208 volts AC, 220 volts AC, 240 volts AC, 440 volts AC and 480 volts AC, and at any frequency, such as 50 Hz., 60 Hz. or 400 Hz. In any event, and by way of example, for 208 volts AC 60-Hz. operation, the following component values provide proper operational results:

| Resistor 22 | 82K ohms |
| --- | --- |
| Resistor 24 | 82K ohms |
| Resistor 26 | 3K ohms |
| Resistor 37 | 4.4K ohms |
| Resistor 46 | 1K ohms |
| Capacitor 20 | 0.033 uf. |
| Capacitor 30 | 0.1 uf. |
| Capacitor 34 | 30 uf. |
| Capacitor 42 | 0.003 uf. |
| Relay 32 | 10K ohms coil resistance |

As stated, the invention has multiend purposes, as protecting the load, whatever type of equipment it might be, from a wrong phase sequence, from a lost phase, or from low voltage between any of the phases. In any event, and depending upon the voltage and frequency across lines 12, 14 and 16, the values of resistor 22, resistor 24 and the reactance of capacitor 20 should be equal at the frequency of operation.

As noted, the value of resistor 26 is very small with respect to the values of resistors 22 and 24. Resistor 26 may be variable to assist in the ready selection of a value thereof to apply approximately 10 volts across switch 44. When such value is achieved, switch 44 breaks down, permitting the discharge of the capacitor 30 into the gate of the SCR 40. SCR 40 is then activated, being pulsed every cycle, causing relay 32 to become energized. During normal operation, relay 32 makes contact at 32c as illustrated in the figure.

In the instance of low-voltage detection, if the voltage between lines 12 and 14, lines 14 and 16, or lines 16 and 12 drops, the voltage developed across resistor 26 becomes less than the aforesaid 10 volts, meaning that switch 44 no longer breaks down or fires. Accordingly, coil 32 becomes deenergized because capacitor 30 cannot discharge to operate the SCR 40. Relay 32 becomes deenergized, making contact at 32b, and the load is disconnected.

As to wrong phase sequence monitoring, if, for example, the sequence connected is lines 16–14–12 instead of the desired lines 12–14–16, there is very little voltage drop across resistors 24 and 26, being below the 10 volts illustrated requirement. Accordingly, and as before, the capacitor 30 cannot discharge into the SCR 40 because switch 44 is unable to fire. As a result, the relay 32 is deenergized and the load protected from malfunction. The latter feature is important, for example, in protecting motors from operating other than in a normal rotational direction, where such opposite operation would be damageable, as with pumps, automatic shears, fans or the like.

In monitoring for a lost phase and assuming a motor is the load, the motor generates a "back" e.m.f. of about 80 percent of the normal voltage in the lost phase. Accordingly, the voltage across resistor 24 and resistor 26 slightly decreases and the choice of the value of resistor 26 serves the desired control function. In this regard, the value of resistor 26 can be selected so that switch 44 will not break down when the input voltage on any phase is less than 80 percent thereof. In other words, when switch 44 does not beak down, SCR 40 cannot function nor is relay 32 energized, meaning that the operation of the equipment or load is discontinued. On the other hand, when voltage on the input is above 80 percent, switch 44 breakdown occurs, the SCR 40 functions, and relay 32 is energized. Thus, the device effectively acts as a detector against single phasing.

As to certain other circuit functions, diode 36 provides one-half wave rectification and serves to develop a DC voltage across relay 32. Capacitor 34, in combination with the coil resistance of relay 32, provides delay on any deenergization of relay 32, the latter being important in the instance of momentary line voltage drops due to transients form inductive loads.

A further application of the invention is the use of the monitor not only for protecting a load from low voltage between any of the phases, as discussed, but where it is desired to protect a load from a certain undervoltage. The latter can be accomplished by substituting a resistor 26 of a different value or by making resistor 26 variable as a potentiometer. Further, resistor 46 serves to tie the gate of the SCR 40 to ground, preventing any unwarranted operation of the SCR 40.

From the preceding, it should be apparent that the monitor defining the invention performs varied functions in a positive and reliable manner, serving to protect equipment, maintain low maintenance and continued equipment operation. The specification hereabove serves to describe the invention of the following claims:

I claim:

1. A monitor circuit for a three-phase power system comprising a first line, a second line and a third line, a first resistor interconnecting said first line and said second line, a second resistor interconnecting said second line and said third line, said second line including a first capacitor connecting between said first resistor and said second resistor, a third resistor in series with said second resistor between said second line and said third line, a second capacitor bypassing said third resistor, a relay, means developing a voltage across said relay, switching means responsive to a voltage of said third resistor, and solid-state means responsive to voltage developed across said second capacitor energizing said relay after switching.

2. The monitor circuit of claim 1 where said first resistor, said second resistor and said first capacitor each have an equal ohmic value at the frequency of operation.

3. The monitor circuit of claim 1 where a time delay means is provided for said relay.

4. The monitor circuit of claim 1 where said relay is energized during normal operation.

5. The monitor circuit of claim 1 where said solid-state means has a gate biased to ground.